United States Patent
Yu et al.

(10) Patent No.: US 12,261,967 B2
(45) Date of Patent: Mar. 25, 2025

(54) BLOCKCHAIN SHARDING METHOD COMBINING SPECTRAL CLUSTERING AND REPUTATION VALUE MECHANISM

(71) Applicant: GUANGDONG UNIVERSITY OF TECHNOLOGY, Guangdong (CN)

(72) Inventors: Rong Yu, Guangdong (CN); Libin Cai, Guangdong (CN); Siming Wang, Guangdong (CN); Beihai Tan, Guangdong (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 241 days.

(21) Appl. No.: 17/972,650

(22) Filed: Oct. 25, 2022

(65) Prior Publication Data
US 2024/0073043 A1    Feb. 29, 2024

(30) Foreign Application Priority Data
Aug. 24, 2022   (CN) .......................... 202211021605.X

(51) Int. Cl.
| | |
|---|---|
| H04L 9/40 | (2022.01) |
| G06F 17/16 | (2006.01) |
| G06F 18/22 | (2023.01) |
| G06F 18/23213 | (2023.01) |
| H04L 9/00 | (2022.01) |

(52) U.S. Cl.
CPC ............... *H04L 9/50* (2022.05); *G06F 17/16* (2013.01); *G06F 18/22* (2023.01); *G06F 18/23213* (2023.01)

(58) Field of Classification Search
CPC ..... H04L 9/50; G06F 17/16; G06F 18/23213; G06F 18/22
See application file for complete search history.

(56) References Cited

U.S. PATENT DOCUMENTS

| | | | |
|---|---|---|---|
| 10,496,923 B2* | 12/2019 | Katz | .................... G06Q 20/065 |
| 10,679,128 B2* | 6/2020 | Katz | .................... G07F 17/3237 |
| 11,455,537 B2* | 9/2022 | Katz | .................... G07F 17/3225 |

(Continued)

OTHER PUBLICATIONS

Zheng P, Xu Q, Zheng Z, Zhou Z, Yan Y, Zhang H. Meepo: Sharded consortium blockchain. In2021 IEEE 37th International Conference on Data Engineering (ICDE) Apr. 1, 20219 (pp. 1847-1852). IEEE. (Year: 2021).*

(Continued)

*Primary Examiner* — Syed A Zaidi

(57) ABSTRACT

A blockchain sharding method combining spectral clustering and a reputation value mechanism includes: obtaining, every other account grouping cycle $T_a$, account transaction data recorded during operation of a blockchain to generate an account transaction graph; obtaining an adjacency similarity matrix W and a degree matrix D based on the account transaction graph; generating a Normalized Laplace matrix L based on the adjacency similarity matrix W and the degree matrix D, performing dimension reduction on L to obtain a feature matrix F, and then clustering the feature matrix F with a clustering dimension of k by row through a K-means clustering method; and dividing blockchain accounts into k groups based on an obtained clustering result, and allocating accounts in the k groups to k blockchain shards.

6 Claims, 3 Drawing Sheets

(56) References Cited

U.S. PATENT DOCUMENTS

| | | | |
|---|---|---|---|
| 2018/0276600 A1* | 9/2018 | Fuller | H04L 9/3236 |
| 2019/0018888 A1* | 1/2019 | Madisetti | H04L 9/0637 |
| 2020/0051008 A1* | 2/2020 | Fuller | G06K 7/12 |
| 2020/0410461 A1* | 12/2020 | Moir | G06Q 20/0655 |
| 2024/0380623 A1* | 11/2024 | Campbell | H04L 9/30 |

OTHER PUBLICATIONS

Nguyen LN, Nguyen TD, Dinh TN, Thai MT. Optchain: optimal transactions placement for scalable blockchain sharding. In2019 IEEE 39th International Conference on Distributed Computing Systems (ICDCS) Jul. 7, 2019 (pp. 525-535). IEEE. (Year: 2019).*
NPL Search Terms (Year: 2024).*

* cited by examiner

BLOCKCHAIN SHARDING METHOD COMBINING SPECTRAL CLUSTERING AND REPUTATION VALUE MECHANISM

CROSS REFERENCE TO RELATED APPLICATIONS

The present application claims the benefit of Chinese Patent Application No. 202211021605.X filed on Aug. 24, 2022. All the above are hereby incorporated by reference in their entirety.

TECHNICAL FIELD

The present disclosure relates to the technical field of blockchains, and in particular, to a blockchain sharding method combining spectral clustering and a reputation value mechanism.

BACKGROUND

A blockchain can be regarded as a distributed ledger jointly maintained by nodes in a decentralized network. Any change to the ledger requires a distributed consensus reached in the decentralized network and needs to be recorded honestly. Therefore, the blockchain can reduce trust costs in a multi-party scenario because of its openness, transparency and tamper proofing. A process of reaching consensus in a blockchain includes transaction generation, block construction, block competition, block broadcasting, and the like. The process of distributed blockchain consensus includes multiple steps such as transaction verification, block broadcast, and block information storage. A transaction in the blockchain can be confirmed only after undergoing a complex distributed consensus process and being verified and permitted by most nodes in the network. With an increasing quantity of nodes in the blockchain, more time is required to reach a consensus, and there is a longer delay in processing transactions, which limits scalability of the blockchain.

Inspired by a sharding technology used in the large-scale centralized database, the sharding technology is proposed to apply in the blockchain architecture. After the sharding technology is introduced, nodes in the network are divided into different shards, and the shards process transactions in parallel, which is different from a traditional blockchain. In a shard-based blockchain system, a single shard only needs to undertake part of the work of the whole network, and the shards work in parallel. A throughput of the whole network increases linearly with an increase in a quantity of shards, thereby improving the throughput of the whole network.

However, it is difficult and time-consuming to verify a cross-shard transaction (CST) between shards in the blockchain when processing the CST, and the existing blockchain sharding do not propose a corresponding method to reduce the cost caused by cross-shard transactions in the system.

SUMMARY

To overcome the defects and shortcomings in the prior art, the present disclosure provides a blockchain sharding method combining spectral clustering and a reputation value mechanism, and a related apparatus, so as to resolve technical problems that an overall system throughput is low due to too many CSTs in a sharded-blockchain system and it is difficult to guarantee security during CST processing.

To achieve the above objective, the present disclosure provides a blockchain sharding method combining spectral clustering and a reputation value mechanism, including:

obtaining every other account grouping cycle $T_a$, account transaction data recorded during operation of a blockchain to generate an account transaction graph;

obtaining an adjacency similarity matrix W and a degree matrix D based on the account transaction graph;

generating a Normalized Laplace matrix L based on the adjacency similarity matrix W and the degree matrix D, performing dimension reduction on L to obtain a feature matrix F, and then clustering the feature matrix F with a clustering dimension of k by row through a K-means clustering method; and dividing blockchain accounts into k groups based on an obtained clustering result, and allocating accounts in the k groups to k blockchain shards.

Preferably, the obtaining an adjacency similarity matrix W and a degree matrix D based on the account transaction graph specifically includes:

setting each account in the account transaction graph as a vertex V;

measuring a relation degree of any pair of vertices $V_i$ and $V_j$ based on a similarity coefficient according to the following formula:

$$w_{ij} = \frac{E(i) \cap E(j)}{E(i) \cup E(j)},$$

where i and j are different, i,j=1, 2, ..., n, E(i) and E(j) represent edge sets of vertex $V_i$ and vertex $V_j$ respectively, E(i)∩E(j) represents an intersection of edges of vertex $V_i$ and vertex $V_j$, and E(i)∪E(j) represents a union of the edges of vertex $V_i$ and vertex $V_j$;

forming the adjacency similarity matrix W based on the relation degree $w_{ij}$ between every two vertices in the account transaction graph, wherein $W=(w_{ij})_{i,j=1,2,\ldots,n}$;

defining $d_i$ as a degree of vertex $V_i$ according to a formula $d_i=\Sigma_{j=1}^{n} w_{ij}$; and defining degrees of all vertices in the account transaction graph as the degree matrix D, where $D=(d_{ij})_{i,j=1,2,\ldots,n}$.

Preferably, the generating a Normalized Laplace matrix L based on the adjacency similarity matrix W and the degree matrix D, performing dimension reduction on L to obtain a feature matrix F, and then clustering the feature matrix F with a clustering dimension of k by row through a clustering method specifically includes:

calculating the Normalized Laplace matrix L, where $L=I-D^{-1}W$, and I represents an identity matrix;

calculating eigenvectors f corresponding to $k_1$ minimum eigenvalues of the obtained Laplace matrix L, and normalizing a matrix constituted by the eigenvectors f to form the $n \times k_1$ feature matrix F; and clustering the feature matrix F with the clustering dimension of k by row through the K-means clustering method.

Preferably, after the dividing blockchain accounts into k groups based on an obtained clustering result, and allocating accounts in the k groups to k blockchain shards, the blockchain sharding method further includes:

rating reputations of all nodes in the blockchain based on a reputation value corresponding to each node;

evenly allocating all the nodes in the blockchain to each shard every other node sharding cycle $T_s$ based on a reputation rating of each node; and selecting a notarization node of a CST based on the reputation rating of each node.

Preferably, the rating reputations of all nodes in the blockchain based on a reputation value corresponding to each node specifically includes:

after p rounds of blockchain transaction processing, rating a reputation of each node in the blockchain based on a reputation value corresponding to the node, rating a node whose reputation value rank in all the nodes in the blockchain is greater than a first preset value as A, rating a node whose reputation value rank in all the nodes in the blockchain is less than a second preset value and greater than a third preset value as B, and rating a node whose reputation value rank in all the nodes in the blockchain is less than a fourth preset value and greater than a fifth preset value as C; and determining a remaining unrated node in the blockchain as an ordinary node, and rating the ordinary node as D.

Preferably, the selecting a notarization node of a CST based on the reputation rating of each node specifically includes:

selecting all nodes whose reputation ratings are A as notarization execution nodes, all nodes whose reputation ratings are B as notarization inspection nodes, and all nodes whose reputation ratings are C as candidate nodes, where there are two types of notarization nodes: the notarization execution node and the notarization inspection node, which form a notarization window, and one notarization execution node and one notarization inspection node form a notarization node pair.

Preferably, the reputation value is $\gamma$, and includes an efficiency score h of the node and an honesty degree score t of the node, where $$\gamma = 2 \cdot \frac{h \cdot t}{h+t};$$

and before rating the reputation of the node in the blockchain based on the reputation value corresponding to the node, the blockchain sharding method further includes:

for each node in the blockchain, giving a processing speed score $h'_{new}$ of the node for a current round of transaction processing based on time consumed by the node to complete the current round of transaction processing, and calculating an updated efficiency score $$h_{new} = \frac{h_{bf} + h'_{new}}{2}$$

of the node based on a previous-round efficiency score $h_{bf}$ of the node and the processing speed score $h'_{new}$ of the node for the current round of transaction processing;

for each node in the blockchain, if the node correctly completes the current round of transaction processing, increasing the honesty degree score of the node by a score q; or if the node performs a malicious operation in the current round of transaction processing, decreasing the honesty degree score of the node by a score r; and calculating an updated honesty degree score $t_{new} = t_{bf} + q - r$ of the node based on a previous-round honesty degree score $t_{bf}$ of the node, as well as the score q and the score r in the current round of transaction processing; where when each node joins a blockchain network, the node is assigned with a basic efficiency score $h_0$ and a basic honesty degree score $t_0$, and when the node is a newly added node, the previous-round efficiency score h bf of the node is $h_0$, and the previous-round honesty degree score $t_{bf}$ of the node is $t_0$.

Preferably, after the selecting a notarization node of a CST based on the reputation rating of each node possible, the blockchain sharding method further includes:

selecting, every other notarization window sliding cycle $T_w$, half of all notarization execution nodes according to a first preset rule, and degrading all the selected notarization execution nodes to ordinary nodes, where the first preset rule is that a notarization execution node with a smaller reputation value may be selected at a greater probability;

selecting a plurality of nodes from all notarization inspection nodes according to a second preset rule, and upgrading all the selected notarization inspection nodes to notarization execution nodes, where the second preset rule is that a notarization inspection node with a larger reputation value may be selected at a greater probability; and selecting a plurality of nodes from all candidate nodes according to a third preset rule, and upgrading all the selected candidate nodes to notarization inspection nodes, where the third preset rule is that a candidate node with a larger reputation value may be selected at a greater probability.

Preferably, after the dividing blockchain accounts into k groups based on an obtained clustering result, and allocating accounts in the k groups to k blockchain shards, the blockchain sharding method further includes:

performing, by a notarization execution node in a rotating notarization node pair, the following steps:

decomposing content of the CST to obtain a source shard sub-transaction and a target shard sub-transaction;

packaging the source shard sub-transaction, submitting the packaged source shard sub-transaction to a source shard for transaction consensus processing, and completing an operation, of the CST, corresponding to a source shard ledger; and packaging the target shard sub-transaction, submitting the packaged target shard sub-transaction to a target shard for transaction consensus processing, and completing an operation, of the CST, corresponding to a target shard ledger; and performing, by a notarization inspection node in the rotating notarization node pair, the following steps:

querying and verifying states of the source shard ledger and the target shard ledger based on the content of the CST; and if the states of the source shard ledger and the target shard ledger match a target state of the CST, determining that the CST is in a completed state; or if the states of the source shard ledger and the target shard ledger do not match a target state of the CST, determining that the CST is in an error state, and broadcasting a CST rollback message to the source shard and the target shard, such that the source shard and the target shard roll back the CST.

Preferably, after the dividing blockchain accounts into k groups based on an obtained clustering result, and allocating accounts in the k groups to k blockchain shards, the blockchain sharding method further includes:

before performing CST processing each time, selecting one notarization execution node and one notarization inspection node from the notarization window according to a fourth preset rule and the reputation value of each node in the notarization window to form the rotating notarization node pair, where the fourth preset rule is that a notarization execution node and a notarization inspection node that have a larger reputation value in the notarization window may be selected at a greater probability.

The present disclosure obtains, every other account grouping cycle $T_a$, the account transaction data recorded during operation of the blockchain to generate the account transaction graph; and obtains the adjacency similarity matrix W and the degree matrix D based on the account transaction diagram. In this way, a correlation between accounts may be calculated, and whether there are lots of transactions between accounts may be evaluated. Then, the blockchain accounts are clustered by a spectral clustering algorithm, and accounts with lots of transactions with each other are allocated to a same group. The blockchain accounts are divided into the k groups based on the clustering result, and the accounts in the k groups are allocated to the k blockchain shards. Thus, the present disclosure can reduce a probability of a CST between shards, thereby reducing a loss caused by the CST and improving transaction processing efficiency of a blockchain network.

BRIEF DESCRIPTION OF THE DRAWINGS

The accompanying drawings incorporated into the specification and constituting a part of the specification illustrate the embodiments of the present disclosure, and are used together with the description to explain the principles of the present disclosure.

To describe the technical solutions in the embodiments of the present disclosure or in the prior art more clearly, the following briefly describes the accompanying drawings required for the description of the embodiments or the prior art. Apparently, a person of ordinary skill in the art may still derive other accompanying drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that all the directional indications (such as upper, lower, left, right, front, and back) in the embodiments of the present disclosure are merely used to explain a relative position relationship, motion situations, and the like of the components in a specific gesture (as shown in the figures). If the specific gesture changes, the directional indication also changes accordingly.

Moreover, the terms such as "first" and "second" used herein are only for the purpose of description and are not intended to indicate or imply relative importance, or implicitly indicate the quantity of the indicated technical features. Thus, features limited by "first" and "second" may expressly or implicitly include at least one of that feature. Further, the technical solutions of the embodiments may be combined with each other on the basis that the combination is implementable by those of ordinary skill in the art. In case a combination of the technical solutions is contradictory or infeasible, such a combination is deemed inexistent and not falling within the protection scope of the present disclosure.

Figure 1:
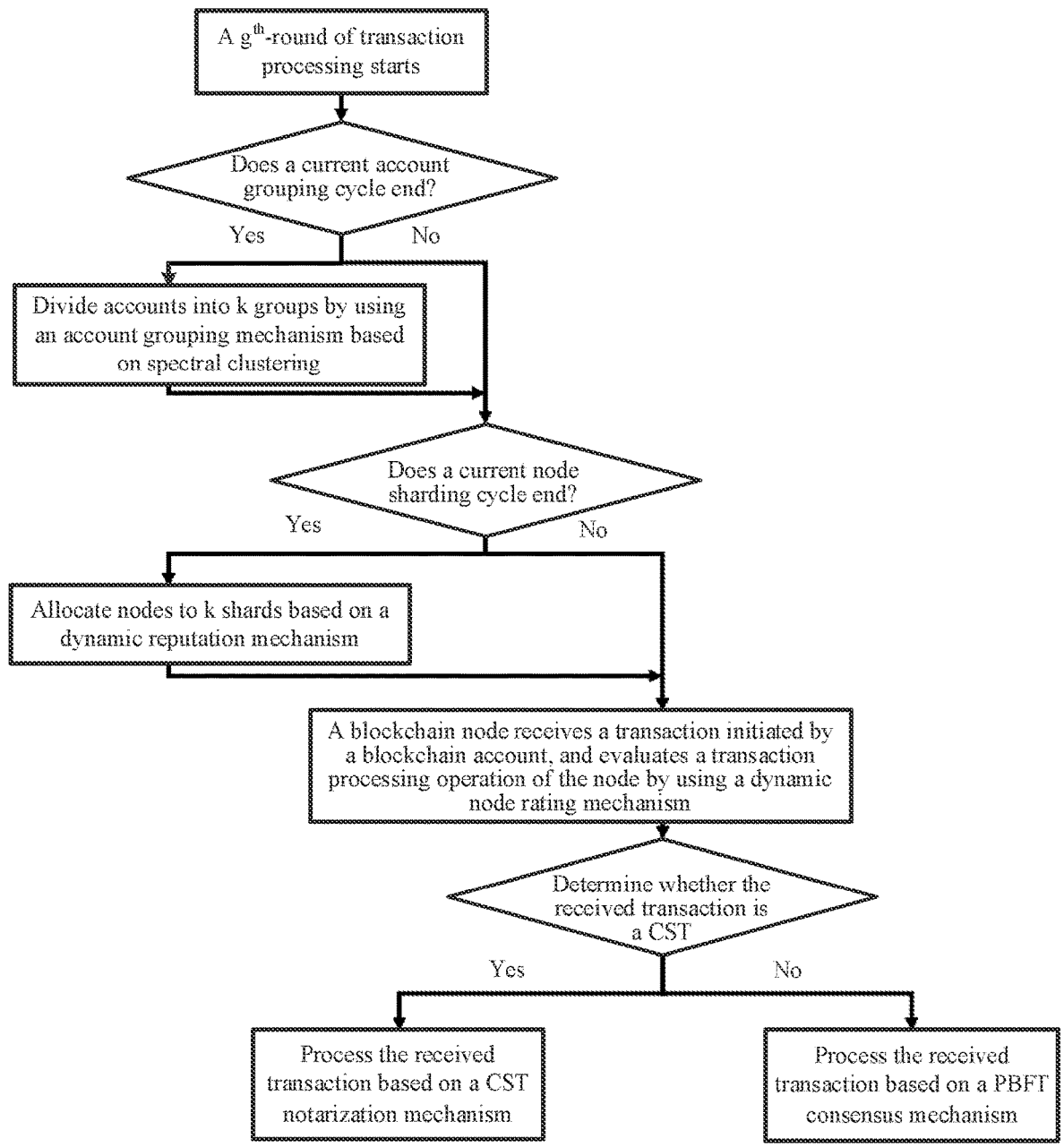
FIG. 1 is a flowchart of a blockchain sharding method combining spectral clustering and a reputation value mechanism according to the present disclosure.

The present disclosure provides a blockchain sharding method combining spectral clustering and a reputation value mechanism. As shown in FIG. 1, the blockchain sharding method includes the following steps:

Step 100: Obtain, every other account grouping cycle $T_a$, account transaction data recorded during operation of a blockchain to generate an account transaction graph.

Step 200: Obtain an adjacency similarity matrix W and a degree matrix D based on the account transaction graph.

Step 300: Generate a Normalized Laplace matrix L based on the adjacency similarity matrix W and the degree matrix D, perform dimension reduction on L to obtain a feature matrix F, and then cluster the feature matrix F with a clustering dimension of k by row through a K-means clustering method.

Step 400: Divide blockchain accounts into k groups based on an obtained clustering result, and allocate accounts in the k groups to k blockchain shards.

The present disclosure obtains, every other account grouping cycle $T_a$, the account transaction data recorded during operation of the blockchain to generate the account transaction graph; and obtains the adjacency similarity matrix W and the degree matrix D based on the account transaction diagram. In this way, a correlation between accounts can be calculated, and whether there are lots of transactions between accounts can be evaluated. Then, the blockchain accounts are clustered by a spectral clustering algorithm, and accounts with lots of transactions with each other are allocated to a same group. The blockchain accounts are divided into the k groups based on the clustering result, and the accounts in the k groups are allocated to the k blockchain shards. The present disclosure can reduce a probability of a CST between shards, thereby reducing a loss caused by the CST and improving transaction processing efficiency of a blockchain network.

Preferably, the obtaining an adjacency similarity matrix W and a degree matrix D based on the account transaction graph in step 200 includes the following substeps:

Step 210: Set each account in the account transaction graph as a vertex V.

Step 220: Measure a relation degree of any pair of vertices $V_i$ and $V_j$ based on a similarity coefficient according to the following formula:

$$w_{ij} = \frac{E(i) \cap E(j)}{E(i) \cup E(j)},$$

where i and j are different, i,j=1, 2, ..., n, E(i) and E(j) represent edge sets of vertex $V_i$ and vertex $V_j$ respectively, E(i)∩E(j) represents an intersection of edges of vertex $V_i$ and vertex $V_j$, namely, an edge between vertex $V_i$ and vertex $V_j$, and E(i)∪E(j) represents a union of the edges of vertex $V_i$ and vertex $V_j$.

Step 230: Form the adjacency similarity matrix W based on the relation degree $w_{ij}$ between every two vertices in the account transaction graph, where $W=(w_{ij})_{i,j=1,2,\ldots,n}$, Step 240: Define $d_i$ as a degree of vertex $V_i$ according to a formula $d_i = \Sigma_{j=1}^n w_{ij}$.

Step 250: Define degrees of all vertices in the account transaction graph as the degree matrix D, where $D=(d_{ij})_{i,j=1,2,\ldots,n}$.

Preferably, the generating a Normalized Laplace matrix L based on the adjacency similarity matrix W and the degree matrix D, performing dimension reduction on L to obtain a feature matrix F, and then clustering the feature matrix F with a clustering dimension of k by row through a clustering method in step 300 specifically includes the following substeps:

Step 310: Calculate the Normalized Laplace matrix L, where $L=I-D^{-1}W$, and I represents an identity matrix.

Step 320: Calculate eigenvectors f corresponding to $k_1$ minimum eigenvalues of the obtained Laplace matrix L, and normalize a matrix constituted by the eigenvectors f to form the n×$k_1$ feature matrix F.

Step 330: Cluster the feature matrix F with the clustering dimension of k by row through the K-means clustering method, where each row in F is used as a $k_1$-dimensional sample, and there are a total of n samples.

Preferably, after the dividing blockchain accounts into k groups based on an obtained clustering result, and allocating accounts in the k groups to k blockchain shards in step 400, the blockchain sharding method further includes the following steps:

Step 500: Rate reputations of all nodes in the blockchain based on a reputation value corresponding to each node.

Step 510: Evenly allocate all the nodes in the blockchain to each shard every other node sharding cycle $T_s$ based on a reputation rating of each node.

Step 520: Select a notarization node of a CST based on the reputation rating of each node.

Steps 500 to 520 are content of a dynamic reputation value mechanism. The dynamic reputation value mechanism is constituted by a node division mechanism, a node state transition mechanism, and a notarization window sliding mechanism.

Based on the dynamic reputation value mechanism, a reputation of each node in the blockchain is dynamically rated based on a transaction processing speed and a behavior honesty degree of the node, and a reputation rating of the node is taken as a standard to select the best among all nodes as the notarization node of the CST and evenly allocate all the nodes in the blockchain network to each shard based on the reputation rating of each node. This ensures security of transaction processing of each blockchain shard, guarantees a performance balance among blockchain shards, and improves overall performance of the network.

Preferably, step 500 specifically includes the following substeps:

Step 501: After p rounds of blockchain transaction processing, rate the reputation of each node in the blockchain based on the reputation value corresponding to the node, rate a node whose reputation value rank in all the nodes in the blockchain is greater than a first preset value as A, rate a node whose reputation value rank in all the nodes in the blockchain is less than a second preset value and greater than a third preset value as B, and rate a node whose reputation value rank in all the nodes in the blockchain is less than a fourth preset value and greater than a fifth preset value as C.

Step 502: Determine a remaining unrated node in the blockchain as an ordinary node, and rate the ordinary node as D.

Preferably, step 520 specifically includes:

selecting all nodes whose reputation ratings are A as notarization execution nodes, all nodes whose reputation ratings are B as notarization inspection nodes, and all nodes whose reputation ratings are C as candidate nodes, where there are two types of notarization nodes: the notarization execution node and the notarization inspection node, which form a notarization window, and one notarization execution node and one notarization inspection node form a notarization node pair.

Figure 2:
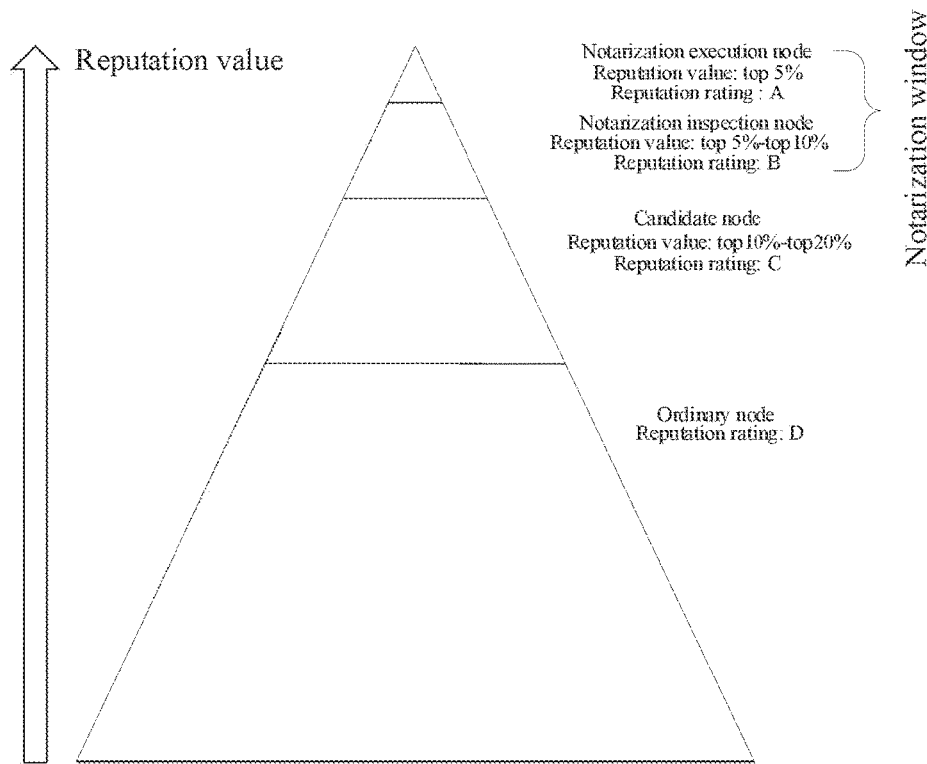
FIG. 2 shows reputation rating in a blockchain sharding method combining spectral clustering and a reputation value mechanism according to the present disclosure.

Specifically, as shown in FIG. 2, the nodes are divided after p rounds of random blockchain transaction processing (a value of P is dynamically set based on security needs). For the nodes in the blockchain network, the reputation of each node is rated based on a latest reputation value of the node. Among all nodes ranked in descending order based on reputation values, the top %5 of the nodes are rated as A, nodes with reputation value rankings less than those of the top 5% of the nodes and greater than those of the top 10% of the nodes are rated as B, nodes with reputation value rankings less than those of the top 10% of the nodes and greater than those of the top 20% of the nodes are rated as C, and remaining nodes are ordinary nodes whose reputation ratings are D. All the nodes whose reputation ratings are A are selected as the notarization execution nodes, all the nodes whose reputation ratings are B are selected as the notarization inspection nodes, and all the nodes whose reputation ratings are C are selected as candidate nodes. All the notarization inspection nodes and notarization execution nodes are collectively referred to as notarization nodes and form the notarization window. The content executed in the above steps 500 and 520 is the node division mechanism.

Preferably, the reputation value is γ, and includes an efficiency score h of the node and an honesty degree score t of the node, where γ can be obtained according to a formula $$\gamma = 2 \cdot \frac{h \cdot t}{h + t}.$$

Before step 500, the blockchain sharding method further includes the following steps:

Step 401: For each node in the blockchain, give a processing speed score $h'_{new}$ of the node for a current round of transaction processing based on time consumed by the node to complete the current round of transaction processing, and calculate an updated node efficiency score $$h_{new} = \frac{h_{bf} + h'_{new}}{2}$$

based on a previous-round efficiency score $h_{bf}$ of the node and the processing speed score $h'_{new}$ of the node for the current round of transaction processing.

Step 402: For each node in the blockchain, if the node correctly completes the current round of transaction processing, increase the honesty degree score of the node by a score q; or if the node performs a malicious operation in the current round of transaction processing, decrease the honesty degree score of the node by a score r.

Step 403: Calculate an updated honesty degree score $t_{new}=t_{bf}+q-r$ of the node based on a previous-round honesty degree score $t_{bf}$ of the node, as well as the score q and the score r in the current round of transaction processing, where when each node joins the blockchain network, the node is assigned with a basic efficiency score $h_0$ and a basic honesty degree score $t_0$, and when the node is a newly added node, the previous-round efficiency score $h_{bf}$ of the node is $h_0$, and the previous-round honesty degree score $t_{bf}$ of the node is $t_0$.

Specifically, the node is assigned the basic efficiency score $h_0$ and the basic honesty degree score $t_0$ when joining the blockchain network. It is assumed that an efficiency score and a honesty degree score of a node before each round of transaction processing are $h_{bf}$ and $t_{bf}$ respectively. When the node is a newly added node, a previous-round efficiency score $h_{bf}$ of the node is $h_0$, and previous-round honesty degree score $t_{bf}$ of the node is $t_0$. After each round of blockchain transaction processing, the efficiency score and the honesty degree score of each node are updated to $h_{new}$ and $t_{new}$ respectively. Therefore, after a round of blockchain processing, methods for updating the efficiency score and the honesty degree score of each node are as follows:

Updating of the efficiency score of the node: The processing speed score $h'_{new}$ of the node for the current round of transaction processing is given based on the time consumed by the node to complete the current round of transaction processing. Therefore, based on processing speeds of the node for a previous round of transaction processing and the current round of transaction processing, the efficiency score of the node is updated according to a formula $$h_{new} = \frac{h_{bf} + h'_{new}}{2}.$$

Updating of the honesty degree score of the node: If the node correctly completes the current round of transaction processing, the honesty degree score of the node is increased by the score q; or if the node performs a malicious operation in the current round of transaction processing, the honesty degree score of the node is decreased by the score r. Therefore, the honesty degree score of the node is updated according to a formula $t_{new}=t_{bf}+q-r$.

Preferably, the node state transition mechanism is as follows:

A node whose reputation rating is D is an ordinary node, and can only participate in an intra-shard transaction consensus process without other functional rights; a node whose reputation rating is C is a candidate node, and can be upgraded to a notarization inspection node; a node whose reputation rating is B is a notarization inspection node, and the notarization inspection node can check and control behavior of the notarization execution node, and can be upgraded to a notarization execution node; and a node whose reputation ranking is A can be used as a notarization execution node to process the CST.

Preferably, a role of the node is dynamically transferred, which is mainly related to behavior of the node during transaction processing. During transaction processing, if the node fails or sends a message inconsistent with messages sent by most nodes, the reputation value of the node is decreased accordingly. Therefore, after step 520, the blockchain sharding method further includes the following steps:

Step 521: Select, every other notarization window sliding cycle $T_w$, half of all notarization execution nodes according to a first preset rule, and degrade all the selected notarization execution nodes to ordinary nodes, where the first preset rule is that a notarization execution node with a smaller reputation value can be selected at a greater probability.

Step 522: Select a plurality of nodes from all the notarization inspection nodes according to a second preset rule to supplement the degraded notarization execution nodes in the previous process, and upgrade all the selected notarization inspection nodes to notarization execution nodes, where the second preset rule is that a notarization inspection node with a larger reputation value can be selected at a greater probability. Specifically, since reputation value rating is performed based on a ranking ratio of reputation values, the notarization inspection node selected to supplement the degraded notarization execution node whose rating is A is originally rated as B. Therefore, a reputation value of the selected notarization inspection node further needs to be increased to a lowest reputation value corresponding to the node whose rating is A (namely, a lowest score of the top 5% of reputation values of all the nodes in the blockchain).

Step 523: Select a plurality of nodes from all candidate nodes according to a third preset rule to supplement the upgraded notarization inspection nodes in the previous process, and upgrade all the selected candidate nodes to notarization inspection nodes, where the third preset rule is that a candidate node with a larger reputation value can be selected at a greater probability. Specifically, since reputation value rating is performed based on the ranking ratio of the reputation values, the candidate node selected to supplement the degraded notarization inspection node whose rating is B is originally rated as C. Therefore, a reputation value of the selected candidate node further needs to be increased to a lowest reputation value corresponding to the node whose rating is B (namely, a lowest score of the top 10% of the reputation values of all the nodes in the blockchain).

The content executed in the above steps 521 to 523 is the notarization window sliding mechanism.

Figure 3:
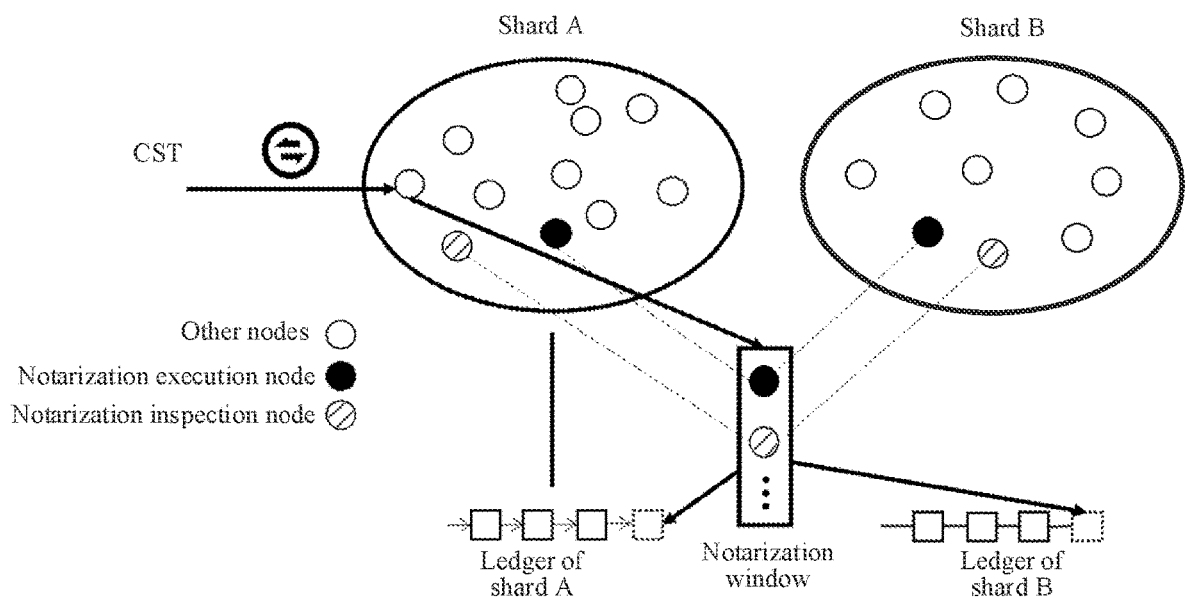
FIG. 3 is a schematic structural diagram of a CST notarization mechanism of a blockchain sharding method combining spectral clustering and a reputation value mechanism according to the present disclosure.
Figure 4:
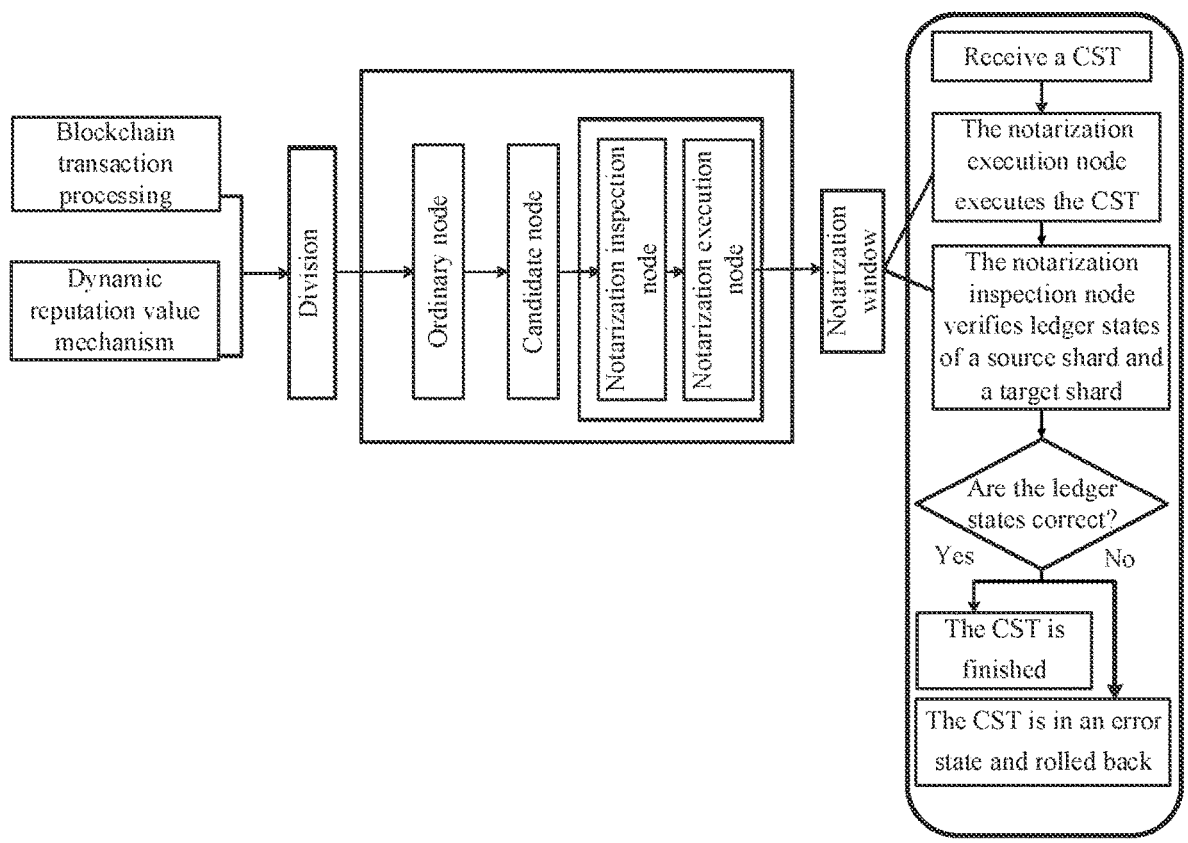
FIG. 4 is a flowchart of a CST notarization mechanism of a blockchain sharding method combining spectral clustering and a reputation value mechanism according to the present disclosure.

Preferably, each node in shards receives an initiated transaction from external request source, and each node verifies and determines the above transaction. If it is determined that the transaction is a CST, the CST is submitted to the notarization window (a node in the notarization window is a public node and belongs to all shards in the network). The notarization window is constituted by a plurality of notarization nodes (the notarization nodes include the notarization execution node and the notarization inspection node). After the CST is submitted to the notarization window, a rotating notarization node pair (consisting of one notarization execution node and one notarization inspection node) in the notarization window processes the CST. Therefore, as shown in FIG. 3 and FIG. 4, after the dividing blockchain accounts into k groups based on an obtained clustering result, and allocating accounts in the k groups to k blockchain shards in step 400, the blockchain sharding method further includes:

performing, by the notarization execution node in the rotating notarization node pair, the following steps:

step 600: decomposing content of the CST to obtain a source shard sub-transaction and a target shard sub-transaction;

step 610: packaging the source shard sub-transaction, submitting the packaged source shard sub-transaction to a source shard for transaction consensus processing, and completing an operation, of the CST, corresponding to a source shard ledger; and step 620: packaging the target shard sub-transaction, submitting the packaged target shard sub-transaction to a target shard for transaction consensus processing, and completing an operation, of the CST, corresponding to a target shard ledger; and performing, by the notarization inspection node in the rotating notarization node pair, the following steps:

step 630: querying and verifying states of the source shard ledger and the target shard ledger based on the content of the CST; and step 640: if the states of the source shard ledger and the target shard ledger match a target state of the CST, determining that the CST is in a completed state; or if the states of the source shard ledger and the target shard ledger do not match a target state of the CST, determining that the CST is in an error state, and broadcasting a CST rollback message to the source shard and the target shard, such that the source shard and the target shard roll back the CST.

Based on a CST notarization mechanism, the notarization execution node decomposes and processes the CST, and then the notarization inspection node verifies the ledger state after the CST is completed, and performs a corresponding operation based on a verification result to ensure atomicity and security of the CST.

Preferably, after the dividing blockchain accounts into k groups based on an obtained clustering result, and allocating accounts in the k groups to k blockchain shards in step 400, the blockchain sharding method further includes the following step:

Step 700: Before performing CST processing each time, select one notarization execution node and one notarization inspection node from the notarization window according to a fourth preset rule and the reputation value of each node in the notarization window to form the rotating notarization node pair, where the fourth preset rule is that a notarization execution node and a notarization inspection node that have a larger reputation value in the notarization window can be selected as the notarization node pair at a greater probability. The content executed in the above step 700 is a rotating mechanism for notarization window sliding.

The above are only specific implementations of the present disclosure, such that those skilled in the art can understand or realize the present disclosure. Various modifications to these embodiments are readily apparent to a person skilled in the art, and the generic principles defined herein may be practiced in other embodiments without departing from the spirit or scope of the present disclosure. Thus, the present disclosure is not limited to the embodiments shown herein but falls within the widest scope consistent with the principles and novel features disclosed herein.

The invention claimed is:

1. A blockchain sharding method combining spectral clustering and a reputation value mechanism, comprising:

obtaining, every other account grouping cycle $T_a$, account transaction data recorded during operation of a blockchain to generate an account transaction graph;

obtaining an adjacency similarity matrix W and a degree matrix D based on the account transaction graph;

generating a Normalized Laplace matrix L based on the adjacency similarity matrix W and the degree matrix D, performing dimension reduction on L to obtain a feature matrix F, and then clustering the feature matrix F with a clustering dimension of k by row through a K-means clustering method; and dividing blockchain accounts into k groups based on an obtained clustering result, and allocating accounts in the k groups to k blockchain shards;

wherein after the dividing blockchain accounts into k groups based on an obtained clustering result, and allocating accounts in the k groups to k blockchain shards, the blockchain sharding method further comprises:

rating reputations of all nodes in the blockchain based on a reputation value corresponding to each node;

evenly allocating all the nodes in the blockchain to each shard every other node sharding cycle $T_s$ based on a reputation rating of each node; and selecting a notarization node of a cross-shard transaction (CST) based on the reputation rating of each node;

wherein the rating reputations of all nodes in the blockchain based on a reputation value corresponding to each node comprises:

after p rounds of blockchain transaction processing, rating a reputation of each node in the blockchain based on a reputation value corresponding to the node, rating a node whose reputation value rank in all the nodes in the blockchain is greater than a first preset value as A, rating a node whose reputation value rank in all the nodes in the blockchain is less than a second preset value and greater than a third preset value as B, and rating a node whose reputation value rank in all the nodes in the blockchain is less than a fourth preset value and greater than a fifth preset value as C; and determining a remaining unrated node in the blockchain as an ordinary node, and rating the ordinary node as D;

wherein the reputation value is $\gamma$, and comprises an efficiency score h of the node and an honesty degree score t of the node, wherein $$\gamma = 2 \cdot \frac{h \cdot t}{h + t};$$

and before rating the reputation of the node in the blockchain based on the reputation value corresponding to the node, the blockchain sharding method further comprises:

for each node in the blockchain, giving a processing speed score $h'_{new}$ of the node for a current round of transaction processing based on time consumed by the node to complete the current round of transaction processing, and calculating an updated efficiency score $$h_{new} = \frac{h_{bf} + h'_{new}}{2}$$

of the node based on a previous-round efficiency score $h_{bf}$ of the node and the processing speed score $h'_{new}$ of the node for the current round of transaction processing;

for each node in the blockchain, if the node correctly completes the current round of transaction processing, increasing the honesty degree score of the node by a score q; or if the node performs a malicious operation in the current round of transaction processing, decreasing the honesty degree score of the node by a score r; and calculating an updated honesty degree score $t_{new}=t_{bf}+q-r$ of the node based on a previous-round honesty degree score $t_{bf}$ of the node, as well as the score q and the score r in the current round of transaction processing; wherein when each node joins a blockchain network, the node is assigned with a basic efficiency score $h_0$ and a basic honesty degree score $t_0$, and when the node is a newly added node, the previous-round efficiency score $h_{bf}$ of the node is $h_0$, and the previous-round honesty degree score $t_{bf}$ of the node is $t_0$;

wherein the selecting a notarization node of a CST based on the reputation rating of each node comprises:

selecting all nodes whose reputation ratings are A as notarization execution nodes, all nodes whose reputation ratings are B as notarization inspection nodes, and all nodes whose reputation ratings are C as candidate nodes, wherein there are two types of notarization nodes: the notarization execution node and the notarization inspection node, which form a notarization window, and one notarization execution node and one notarization inspection node form a notarization node pair;

wherein each node in shards receives an initiated transaction from external request source, and each node verifies and determines the initiated transaction; if the initiated transaction is determined as a CST, the CST is submitted to the notarization window.

2. The blockchain sharding method combining spectral clustering and a reputation value mechanism according to claim 1, wherein the obtaining an adjacency similarity matrix W and a degree matrix D based on the account transaction graph comprises:

setting each account in the account transaction graph as a vertex V;

measuring a relation degree of any pair of vertices $V_i$ and $V_j$ based on a similarity coefficient according to the following formula:

$$w_{ij} = \frac{E(i) \cap E(j)}{E(i) \cup E(j)},$$

wherein i and j are different, i, j=1, 2, ..., n, E(i) and E(j) represent edge sets of vertex $V_i$ and vertex $V_j$ respectively, E(i)∩E(j) represents an intersection of edges of vertex $V_i$ and vertex $V_j$, and E(i)∪E(j) represents a union of the edges of vertex $V_i$ and vertex $V_j$;

forming the adjacency similarity matrix W based on the relation degree $w_{ij}$ between every two vertices in the account transaction graph, wherein $W=(w_{ij})_{i,j=1,2,\ldots n}$;

defining $d_i$ as a degree of vertex $V_i$ according to a formula $d_i=\Sigma_{j=1}^{n}w_{ij}$; and defining degrees of all vertices in the account transaction graph as the degree matrix D, wherein $D=(d_{ij})_{i,j=1,2,\ldots,n}$.

3. The blockchain sharding method combining spectral clustering and a reputation value mechanism according to claim 2, wherein the generating a Normalized Laplace matrix L based on the adjacency similarity matrix W and the degree matrix D, performing dimension reduction on L to obtain a feature matrix F, and then clustering the feature matrix F with a clustering dimension of kby row through a K-means clustering method comprises:

calculating the Normalized Laplace matrix L, wherein $L=I-D^{-1}W$, and I represents an identity matrix;

calculating eigenvectors f corresponding to $k_1$ minimum eigenvalues of the obtained Laplace matrix L, and normalizing a matrix constituted by the eigenvectors f to form the $n \times k_1$ feature matrix F; and clustering the feature matrix F with the clustering dimension of k by row through the K-means clustering method.

4. The blockchain sharding method combining spectral clustering and a reputation value mechanism according to claim 1, wherein after the selecting a notarization node of a CST based on the reputation rating of each node, the blockchain sharding method further comprises:

selecting, every other notarization window sliding cycle $T_w$, half of all notarization execution nodes according to a first preset rule, and degrading all the selected notarization execution nodes to ordinary nodes, wherein the first preset rule is that a notarization execution node with a smaller reputation value is selected at a greater probability;

selecting a plurality of nodes from all notarization inspection nodes according to a second preset rule, and upgrading all the selected notarization inspection nodes to notarization execution nodes, wherein the second preset rule is that a notarization inspection node with a larger reputation value is selected at a greater probability; and selecting a plurality of nodes from all candidate nodes according to a third preset rule, and upgrading all the selected candidate nodes to notarization inspection nodes, where the third preset rule is that a candidate node with a larger reputation value is selected at a greater probability.

5. The blockchain sharding method combining spectral clustering and a reputation value mechanism according to claim 1, wherein after the dividing blockchain accounts into k groups based on an obtained clustering result, and allocating accounts in the k groups to k blockchain shards, the blockchain sharding method further comprises:

performing, by a notarization execution node in a rotating notarization node pair, the following steps:

decomposing content of the CST to obtain a source shard sub-transaction and a target shard sub-transaction;

packaging the source shard sub-transaction, submitting the packaged source shard sub-transaction to a source shard for transaction consensus processing, and completing an operation, of the CST, corresponding to a source shard ledger; and packaging the target shard sub-transaction, submitting the packaged target shard sub-transaction to a target shard for transaction consensus processing, and completing an operation, of the CST, corresponding to a target shard ledger; and performing, by a notarization inspection node in the rotating notarization node pair, the following steps:

querying and verifying states of the source shard ledger and the target shard ledger based on the content of the CST; and if the states of the source shard ledger and the target shard ledger match a target state of the CST, determining that the CST is in a completed state; or if the states of the source shard ledger and the target shard ledger do not match a target state of the CST, determining that the CST is in an error state, and broadcasting a CST rollback message to the source shard and the target shard, such that the source shard and the target shard roll back the CST.

6. The blockchain sharding method combining spectral clustering and a reputation value mechanism according to claim 5, wherein after the dividing blockchain accounts into k groups based on an obtained clustering result, and allocating accounts in the k groups to k blockchain shards, the blockchain sharding method further comprises:

before performing CST processing each time, selecting one notarization execution node and one notarization inspection node from the notarization window according to a fourth preset rule and the reputation value of each node in the notarization window to form the rotating notarization node pair, wherein the fourth preset rule is that a notarization execution node and a notarization inspection node that have a larger reputation value in the notarization window are selected at a greater probability.

* * * * *